United States Patent
Stauffer et al.

(10) Patent No.: US 10,499,304 B1
(45) Date of Patent: Dec. 3, 2019

(54) FIFTH GENERATION NEW RADIO EDGE COMPUTING MOBILITY MANAGEMENT

(71) Applicant: Google LLC, Mountain View, CA (US)

(72) Inventors: Erik Richard Stauffer, Sunnyvale, CA (US); Jibing Wang, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/011,332

(22) Filed: Jun. 18, 2018

(51) Int. Cl.
*H04W 36/32* (2009.01)
*H04W 36/00* (2009.01)
*H04W 36/08* (2009.01)
*H04W 92/20* (2009.01)

(52) U.S. Cl.
CPC ........ *H04W 36/32* (2013.01); *H04W 36/0011* (2013.01); *H04W 36/08* (2013.01); *H04W 92/20* (2013.01)

(58) Field of Classification Search
CPC . H04W 36/32; H04W 36/0011; H04W 36/08; H04W 92/20
See application file for complete search history.

(56) References Cited

U.S. PATENT DOCUMENTS

| | | | | |
|---|---|---|---|---|
| 2018/0242204 A1* | 8/2018 | Zhu | ................... | H04W 36/0033 |
| 2018/0249389 A1* | 8/2018 | Zhu | ...................... | H04W 36/06 |
| 2018/0376445 A1* | 12/2018 | Yoon | ....................... | H04W 8/20 |
| 2019/0045409 A1* | 2/2019 | Rasanen | ........... | H04W 36/0016 |

FOREIGN PATENT DOCUMENTS

| | | | |
|---|---|---|---|
| WO | 2017129742 | 8/2017 | |
| WO | 2017187011 | 11/2017 | |
| WO | WO-2017187011 A1 * | 11/2017 | ............ H04W 36/12 |

OTHER PUBLICATIONS

"Mobile Edge Computing (MEC); Framework and Reference Architecture", ETSI GS MEC 003 V1.1.1 (Mar. 2016), Mar. 2016, 18.
"Mobile Edge Computing (MEC); Technical Requirements", ETSI GS MEC 002 V1.1.1 (Mar. 2016), Mar. 2016, 40 pages.
"Mobile Edge Computing(MEC); Mobile Edge Platform Application Enablement", ETSI GS MEC 011 V1.1.1 (Jul. 2017), Jul. 2017, 55 pages.

* cited by examiner

*Primary Examiner* — Wayne H Cai
(74) *Attorney, Agent, or Firm* — Colby Nipper PLLC (57) ABSTRACT

This document describes mobility management of edge computing resources in fifth generation new radio (5G NR) wireless networks. The techniques described enable authorizing user devices to access edge compute servers that execute applications for the user device. The techniques described also enable the migration of applications of user devices between edge compute servers based on mobility changes of user devices in a wireless network, such as handovers of a user device between base stations in the wireless network.

20 Claims, 5 Drawing Sheets

FIFTH GENERATION NEW RADIO EDGE COMPUTING MOBILITY MANAGEMENT

BACKGROUND

The evolution of wireless communication to fifth generation (5G) standards and technologies provides higher data rates and greater capacity, with improved reliability and lower latency, which enhances mobile broadband services. 5G technologies also provide new classes of services for vehicular networking, fixed wireless broadband, and the Internet of Things (IoT).

Latencies for distributed applications in existing wireless networks are limited by the latency associated with connecting a mobile application through the wireless access network and through the Internet to application servers. Computing resources for distributed applications may be placed at the edge of the 5G networks to reduce latency for mobile applications.

Distributed edge computing in 5G networks presents management and mobility issues not addressed in conventional wireless networks and distributed applications. Conventional distributed applications are unaware of user device mobility in wireless networks, and conventional wireless networks are not architected to manage configuration and mobility for edge computing resources.

SUMMARY

This summary is provided to introduce simplified concepts of fifth generation new radio edge computing mobility management. The simplified concepts are further described below in the Detailed Description. This summary is not intended to identify essential features of the claimed subject matter nor is it intended for use in determining the scope of the claimed subject matter.

In some aspects, a method of managing edge computing resources in a wireless communication network is described, in which an Edge Computing Access and Mobility Function (EC-AMF) server receives an indication of a handover of a user device and determines an edge compute server that is connected, via a base station, to the user device before the handover. Based on receiving the indication of the handover, the EC-AMF server identifies one or more candidate edge compute servers and transfers an application and associated data and context for the application to one of the candidate edge compute servers.

In other aspects, an edge computing-access and mobility server includes one or more processors and a memory comprising instructions for an Edge Computing-Access and Mobility Function (EC-AMF) application, the instructions being executable by the one or more processors to configure the one or more processors to receive an indication of a handover of a user device, and to determine an edge compute server that is connected to the user device via a base station. The instructions are further executable to, based on the reception of the indication of the handover, to identify one or more candidate edge compute servers, and to transfer an application and associated data and context for the application to one of the candidate edge compute servers.

In further aspects, a system includes multiple edge compute servers, each edge compute server being connected to a respective base station in a wireless communication network that includes multiple base stations, an access and mobility server, and an Edge Computing-Access and Mobility (EC-AMF) server. The EC-AMF server receives, from the access and mobility server, an indication of a handover of a user device from a first base station to a second base station in the wireless communication network and determines a first edge compute server that is connected to the user device via the first base station. Based on the reception of the indication of the handover, the EC-AMF server determines a second edge compute server that is connected to the second base station and transfers an application and associated data and context for the application from the first edge compute server to the second edge compute server.

BRIEF DESCRIPTION OF THE DRAWINGS

Aspects of fifth generation new radio edge computing mobility management are described with reference to the following drawings. The same numbers are used throughout the drawings to reference like features and components.

DETAILED DESCRIPTION

Overview

This document describes mobility management of edge computing resources in fifth generation new radio (5G NR) wireless networks. The techniques described enable authorizing user devices to access edge compute servers that execute applications for the user device. The techniques described also enable the migration of applications of user devices between edge compute servers based on mobility changes of user devices in a wireless network, such as handovers of a user device between base stations in the wireless network.

As wireless communication systems evolve to 5G NR technologies, edge computing resources will be deployed at or near base stations to provide lower latency and higher bandwidth to mobile applications by eliminating or reducing communication through the Internet to application servers. In existing wireless access networks, the wireless access network manages a packet data context for each mobile device when the mobile device connects to the wireless access network and as the mobile device is handed off between base stations within the wireless access network. Distributing compute resources to the edge of 5G NR networks can provide lower latencies. Doing so, however, adds complexity to managing these compute resources. Distributing compute resources to the edge of 5G NR networks can also provide mobility management for applications along with data and context for the applications as mobile devices are handed off between the base stations. This again, however, adds complexity.

In aspects, fifth generation new radio edge computing mobility management provides new interfaces, messages, and management functions to support edge computing, to coordinate operations between the edge computing resources, and to manage mobility of applications and application data between edge computing resources in the radio access network.

While features and concepts of the described systems and methods for fifth generation new radio edge computing mobility management can be implemented in any number of different environments, systems, devices, and/or various configurations, aspects of fifth generation new radio edge computing mobility management are described in the context of the following example devices, systems, and configurations.

Example Environment

Figure 1:
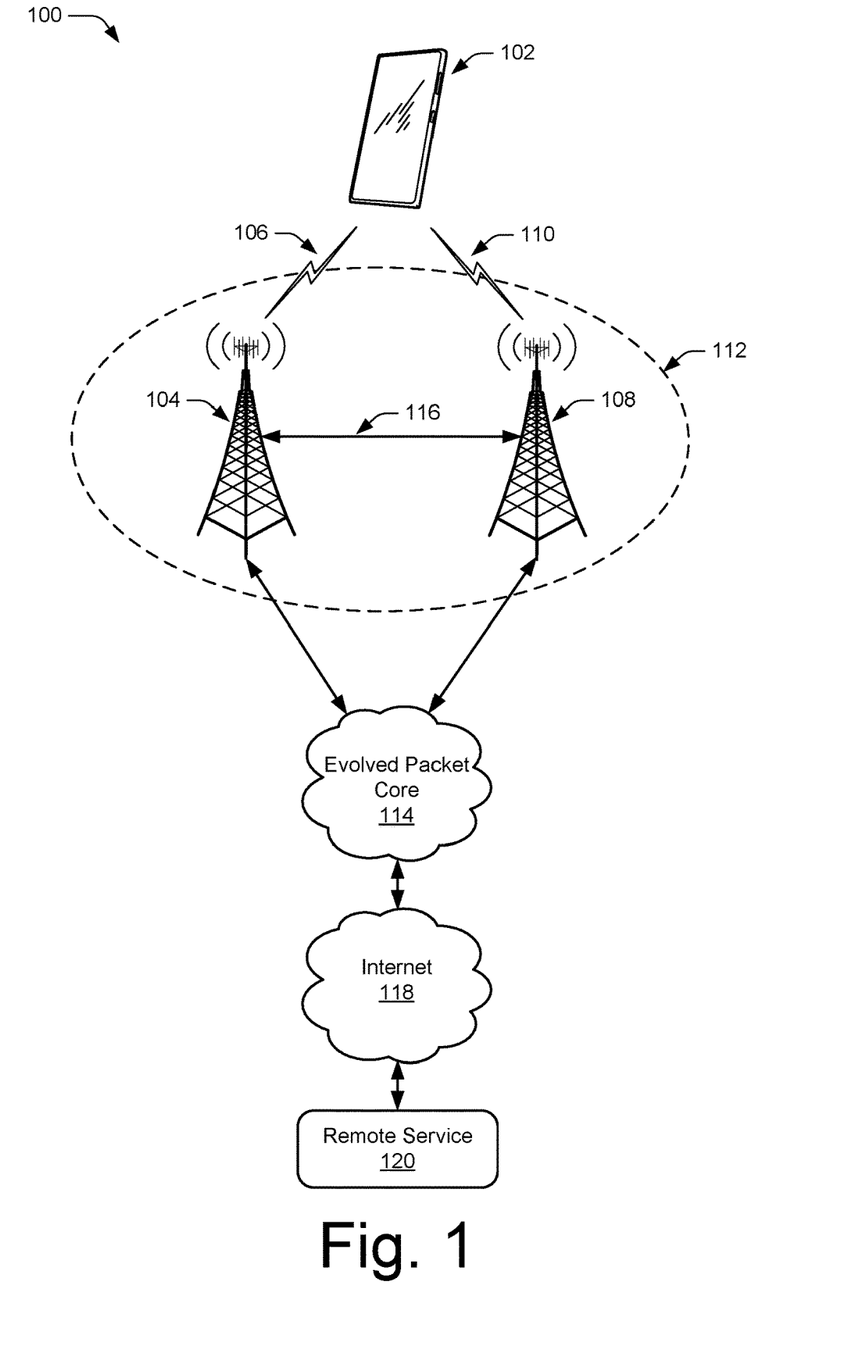
FIG. 1 illustrates an example wireless network environment in which various aspects of fifth generation new radio edge computing mobility management can be implemented.

FIG. 1 illustrates an example environment 100, which includes a user equipment 102 (user device 102) that communicates with a base station 104 that acts as a serving cell, (serving cell base station 104), through a wireless communication link 106 (wireless link 106). In this example, the user equipment 102 is implemented as a smartphone. Although illustrated as a smartphone, the user equipment 102 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base station 104 (e.g., an Evolved Universal Terrestrial Radio Access Network Node B, E-UTRAN Node B, evolved Node B, eNodeB, eNB, Next Generation Node B, gNode B, gNB, and the like) may be implemented in a macrocell, microcell, small cell, picocell, and the like, or any combination thereof.

The base station 104 communicates with the user equipment 102 via the wireless link 106, which may be implemented as any suitable type of wireless link. The wireless link 106 can include a downlink of data and control information communicated from the base station 104 to the user equipment 102, an uplink of other data and control information communicated from the user equipment 102 to the base station 104, or both. The wireless link 106 may include one or more wireless links or bearers implemented using any suitable communication protocol or standard, or combination of communication protocols or standards such as 3rd Generation Partnership Project Long-Term Evolution (3GPP LTE), 5G NR, and so forth.

In aspects, the user equipment 102 communicates with another base station 104 (a neighbor base station 108), via a wireless link 110. The wireless link 110 may be implemented using the same communication protocol or standard, or a different communication protocol or standard, than the wireless link 106. For example, the wireless link 106 is a 5G NR link and the wireless link 110 is an LTE link. The base station 104, the neighbor base station 108, and any additional base stations (not illustrated for clarity) are collectively a Radio Access Network 112 (RAN 112, Evolved Universal Terrestrial Radio Access Network 112, E-UTRAN 112), which are connected via an Evolved Packet Core 114 (EPC 114) network to form a wireless operator network. The base station 104 and the neighbor base station 108 can communicate using an Xn Application Protocol (XnAP), at 116, to exchange user-plane and control-plane data. The user equipment 102 may connect, via the EPC 114, to public networks, such as the Internet 118 to interact with a remote service 120.

Figure 2:
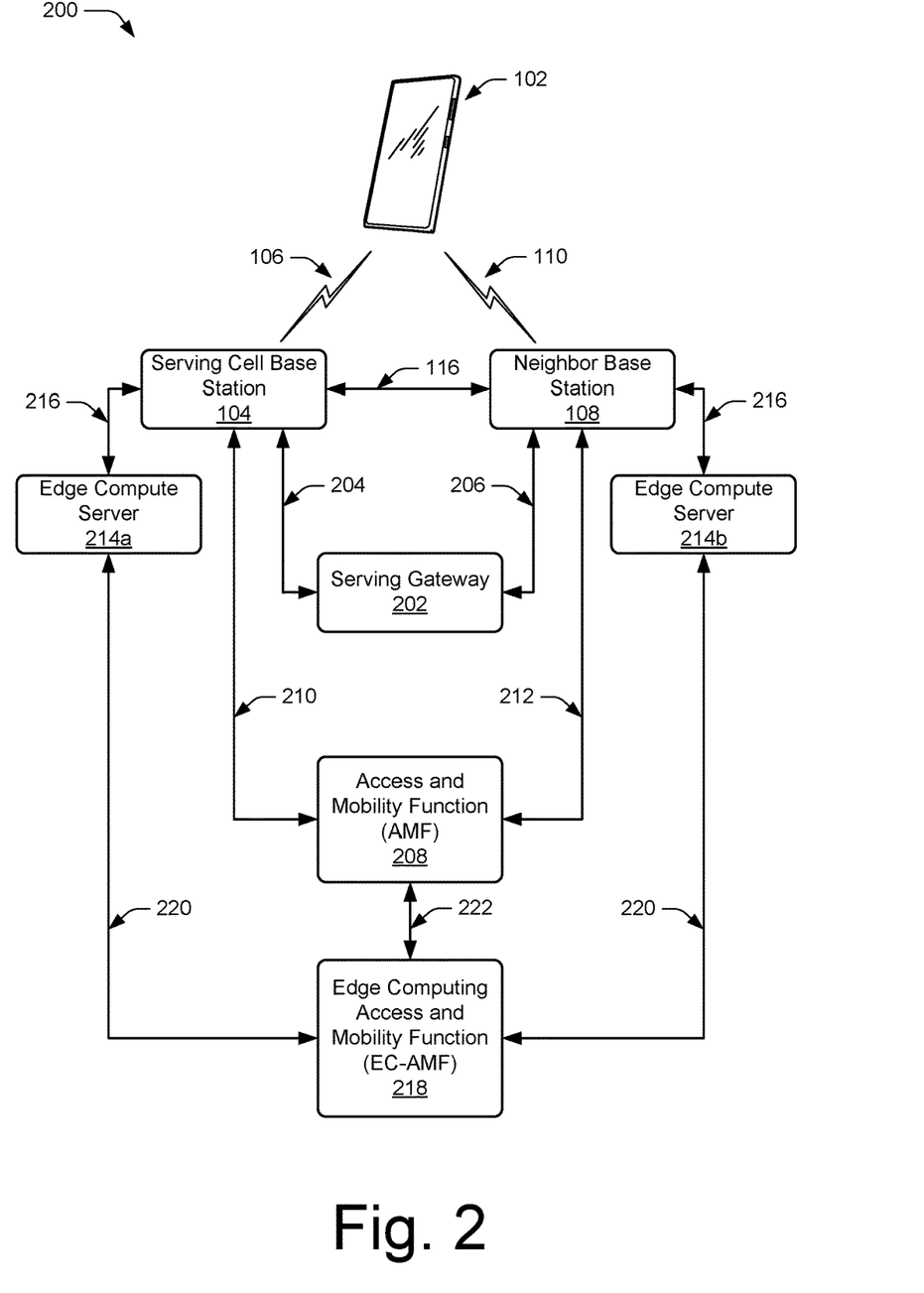
FIG. 2 illustrates an example environment in which various aspects of fifth generation new radio edge computing mobility management can be implemented.

FIG. 2 illustrates an example environment 200 in which various aspects of fifth generation new radio edge computing mobility management can be implemented. User-plane data flows to and from the serving cell base station 104 and the neighbor base station 108 via a serving gateway 202 in the evolved packet core 114, as shown at 204 and 206, respectively. The serving gateway 202 is connected to the Internet 118. For the sake of clarity of illustration, the EPC 114, and the connection of the serving gateway 202 to the Internet 118 are omitted from FIG. 2.

An Access and Mobility Function (AMF) 208 provides control-plane functions such as registration and authentication of user devices 102, authorization, mobility management, and the like. The AMF 208 communicates with the serving cell base station 104 and the neighbor base station 108, as shown at 210 and 212, respectively. The AMF 208 also communicates with the user device 102, via the serving cell base station 104, the neighbor base station 108, or both.

Edge compute servers 214 (illustrated as 214a and 214b) provide edge computing resources for user applications on the user device 102. Each edge compute server (ECS) 214 is connected to a base station using an Xe interface, shown at 216. Control-plane functions such as granting access to edge compute server 214 resources, managing mobility of applications and associated data and context of the applications between edge compute servers 214, and the like are managed by an Edge Computing Access and Mobility Function (EC-AMF) 218. Control-plane communications between the ECSs 214 and the EC-AMF 218 are shown at 220. When the user device 102 is handed over from the serving cell base station 104 to the neighbor base station 108, the application and any data and context associated with the application is transferred from the edge compute server 214a to the edge compute server 214b. To correctly time the exchange of the application and the application context, the AMF 208 signals the EC-AMF 218, as shown at 222. The signaling indicates that there is a handover of the user device 102, which triggers the EC-AMF 218 to transfer the application and data and context associated with the application from the edge compute server 214a to the edge compute server 214b.

Example Devices

Figure 3:
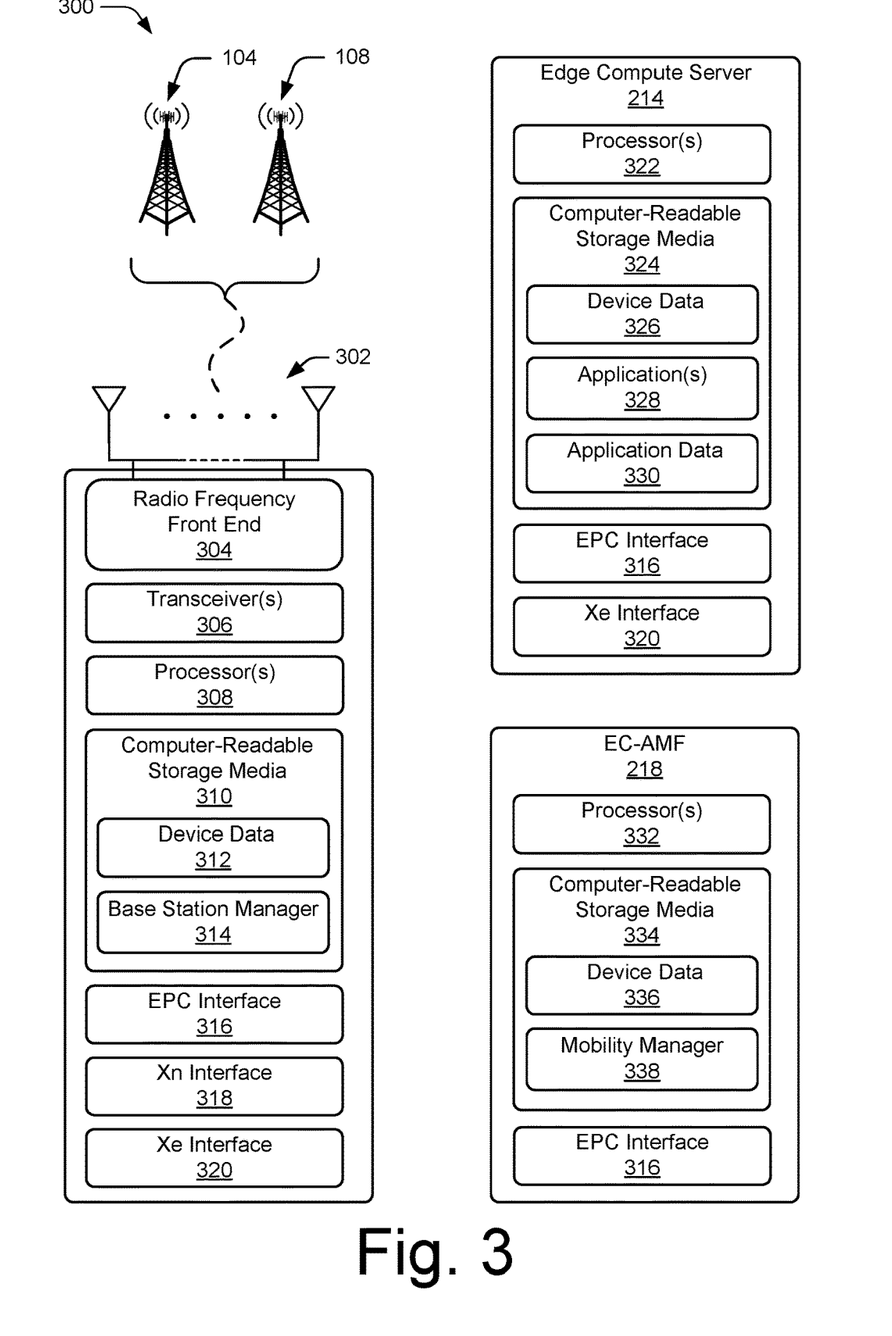
FIG. 3 illustrates an example device diagram for devices that can implement various aspects of fifth generation new radio edge computing mobility management.

FIG. 3 illustrates an example device diagram 300 of the serving cell base station 104, and the neighbor base station 108, the edge compute server 214, and the EC-AMF 218. It should be noted that only the essential features of the serving cell base station 104, and the neighbor base station 108, the edge compute server 214, and the EC-AMF 218 are illustrated here for the sake of clarity.

The device diagram for the serving cell base station 104 and the neighbor base station 108 shown in FIG. 3 includes a single network node (e.g., an E-UTRAN Node B or gNode B). The functionality of the serving cell base station 104 and/or the neighbor base station 108 may be distributed across multiple network nodes and/or devices and may be distributed in any fashion suitable to perform the functions described herein. The serving cell base station 104 and the neighbor base station 108 include antennas 302, a radio frequency front end 304 (RF front end 304), one or more transceivers 306 that includes LTE transceivers, and/or 5G NR transceivers for communicating with the user equipment 102. The RF front end 304 of the serving cell base station 104 and the neighbor base station 108 can couple or connect the transceivers 306 to the antennas 302 to facilitate various types of wireless communication. The antennas 302 of the serving cell base station 104 and the neighbor base station 108 may include an array of multiple antennas that are configured similarly to or differently from each other. The antennas 302 and the RF front end 304 can be tuned to, and/or be tunable to, one or more frequency bands defined by the 3GPP LTE and 5G NR communication standards and implemented by the transceivers 306. Additionally, the antennas 302, the RF front end 304, and/or the transceivers 306 may be configured to support beamforming, such as Massive-MIMO, for the transmission and reception of communications with the user equipment 102.

The serving cell base station 104 and the neighbor base station 108 also include processor(s) 308 and computer-readable storage media 310 (CRM 310). The processor 308 may be a single core processor or a multiple core processor composed of a variety of materials, such as silicon, polysilicon, high-K dielectric, copper, and so on. CRM 310 may include any suitable memory or storage device such as random-access memory (RAM), static RAM (SRAM), dynamic RAM (DRAM), non-volatile RAM (NVRAM), read-only memory (ROM), or Flash memory useful to store device data 312 of the serving cell base station 104 and the neighbor base station 108. The device data 312 includes network scheduling data, radio resource management data, applications, and/or an operating system of the serving cell base station 104 and the neighbor base station 108, which are executable by processor(s) 308 to enable communication with the user equipment 102.

CRM 310 also includes a base station manager 314, which, in one implementation, is embodied on CRM 310 (as shown). Alternately or additionally, the base station manager 314 may be implemented in whole or part as hardware logic or circuitry integrated with or separate from other components of the serving cell base station 104 and the neighbor base station 108. In at least some aspects, the base station manager 314 configures the transceivers 306 for communication with the user equipment 102, as well as communication with the EPC 114 via the EPC Interface 316. The serving cell base station 104 and the neighbor base station 108 include an Xn interface 318, which the base station manager 314 configures to exchange user-plane and control-plane data between the serving cell base station 104 and the neighbor base station 108, to manage the communication of the serving cell base station 104 and/or the neighbor base station 108 with the user equipment 102. The serving cell base station 104 and the neighbor base station 108 include an Xe interface 320, which the base station manager 314 configures to transfer edge computing applications and associated data and context between edge compute servers 214.

The edge compute server 214 includes processor(s) 322 and computer-readable storage media 324 (CRM 324). The processor 322 may be a single core processor or a multiple core processor composed of a variety of materials, such as silicon, polysilicon, high-K dielectric, copper, and so on. CRM 324 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 326 of the ECS 214. The CRM 324 includes applications 328 and application data 330 used by the user device 102, and/or an operating system of the ECS 214, which are executable by processor(s) 322 to enable communication with the user equipment 102, the base station 104 and the EC-AMF 218.

The ECS 214 also includes an Xe interface 320 for communication with the base station for the transfer of edge computing applications to other edge compute servers 214 via base stations 104 using the Xn interface 318 between the base stations 104. The edge compute server 214 includes the EPC interface 316 for communication of user-plane and control-plane data with the EC-AMF 218.

The edge computing access and mobility function 218 may be provided as a service in the core network, distributed across multiple servers, or embodied on a dedicated server. For example, the edge computing access and mobility function 218 is illustrated as being embodied on a single server that includes processor(s) 332 and computer-readable storage media 334 (CRM 334). The processor 332 may be a single core processor or a multiple core processor composed of a variety of materials, such as silicon, polysilicon, high-K dielectric, copper, and so on. CRM 334 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 336 of the EC-AMF 218. The device data 336 includes configuration and/or authorization data for user devices 102 and ECSs 214, and/or an operating system of the EC-AMF 218, which are executable by processor(s) 332 to enable communication with the user equipment 102, the base station 104, and the AMF 208. The EC-AMF 218 also includes the EPC interface 316 for communication of user-plane and control-plane data with the AMF 208 and the ECS 214.

CRM 334 also includes a mobility manager 338, which, in one implementation, is embodied on CRM 334 (as shown). Alternately or additionally, the mobility manager 338 may be implemented in whole or part as hardware logic or circuitry integrated with or separate from other components of the EC-AMF 218. In at least some aspects, the mobility manager 338 configures the ECSs 214 for communication with the user equipment 102.

Edge Computing Configuration and Authorization

The configuration of the edge computing resources that are available to the user device 102 are communicated to the user device 102 from either a base station 104 or via the base station 104 from the EC-AMF 218. The configuration of the edge computing resources is communicated to the user device 102 in an Edge Computing Configuration (ECC) message. The ECC message may include the location of an edge compute server 214, the IP address of the ECS 214, resource availability on the ECS 214, a cost of using the ECS 214, a configuration of the ECS 214, and the like. The ECC message may be sent to the user device 102 periodically or at any time the configuration of the edge computing resources changes, such as after a handover of the user device 102, when an ECS 214 becomes unavailable, when a new ECS 214 becomes available, and so forth. Additionally or alternatively, multiple edge compute servers 214, such as edge compute servers 214 operated by different service providers, may be available at the base station 104. In this alternative, the ECC message may include an identification of the service provider for each ECS 214 to enable the user device 102 to select a service provider for edge computing services from the different providers.

To access resources of the ECS 214, the user device requests to be authorized to use the ECS 214. The user device 102 sends an Edge Compute Authorization message to an Edge Compute Management Server (ECMS) to request access to resources of the ECS 214. The ECMS determines if the requested resources are available and sends an Edge Compute Grant (ECG) message to the user device 102 indicating that access to the ECS 214 resources are authorized or denied. If access to the ECS resources are authorized, the ECMS also sends the ECG message to the ECS

214 to indicate to the ECS 214 that the user device 102 is authorized to use the resources of the ECS 214. The ECMS may be included in the EC-AMF 218, may be remote from the EC-AMF 218, or may be distributed in any suitable manner.

Edge Computing Mobility Management

The Access and Mobility Function 208 in 5G NR networks manages functions including network access control, authorization of user devices 102, radio resource management, mobility management, and the like. As the user device 102 moves about an area served by the radio access network 112, the user device 102 is handed over from one base station 104 to another to maintain communication services for the user device 102. With the addition of edge computing, the mobility of applications as well as data and context for those applications also needs to be managed for each handover of the user device 102.

In aspects, the EC-AMF 218 manages compute mobility for edge computing resources associated with user devices 102 during handovers. The EC-AMF 218 determines the edge compute server 214 to which the user device 102 is connected before a handover is initiated and identifies which edge compute servers 214 are available to the user device 102 after the handover. For example, the user device 102 is connected to the ECS 214*a* before the handover is initiated. The EC-AMF 218 receives information from the AMF 208 about one or more candidate base stations, including the neighbor base station 108 for a handover. Based on the received candidate base station information, the EC-AMF 218 identifies which of the edge compute servers 214 can be used to accept the transfer of applications and associated context for the user device 102 after the handover.

Optionally or additionally, if the EC-AMF 218 cannot identify any edge compute servers 214 to accept the transfer, the EC-AMF 218 may transfer the applications and associated context and data for the user device 102 to a default application server in the Internet 118. When the EC-AMF 218 identifies that an ECS 214, which can accept the transfer becomes available, the EC-AMF 218 transfers the applications and associated context for the user device 102 from the default application server to the newly identified ECS 214.

The EC-AMF 218 receives an indication of the initiation or completion of the handover from the AMF 208 and the EC-AMF 218 initiates forwarding the applications and the data and context associated with the applications to another ECS 214. The EC-AMF 218 sends a User Application Context message to the user device 102 that includes the location of the edge compute server 214 where the applications and the data and context associated with the applications of the user device 102 are being transferred. For example, the EC-AMF 218 receives an indication that the user device 102 is being handed over from the serving cell base station 104 to the neighbor base station 108. The EC-AMF 218 transfers the applications and the data and context associated with the applications for the user device 102 from the ECS 214*a* to the ECS 214*b* and sends the User Application Context message, including the location of the ECS 214*b*, to the user device 102. Alternatively, the applications and associated data and context can be transferred from the ECS 214*a* via the Xe interface 216 to the serving cell base station 104, which in turn transfers the applications and associated data and context via the Xn interface 318 to the neighbor base station 108 that forwards the applications and associated data and context via the Xe interface 216 to the ECS 214*b*.

In another aspect, when the EC-AMF 218 determines there will be a handover of the user device 102, the EC-AMF 218 can initiate the transfer a copy of the applications from the ECS 214 currently in use by the user device 102 to one or more candidate ECSs 214 before the handover. When the handover is initiated or completed, the EC-AMF 218 transfers the context and data for the application to the ECS 214 that is connected to the base station 104 that is receiving the handover of the user device 102. By transferring a copy of the application before the handover the amount of data transferred during the handover is reduced and the latency of the transfer of the application and associated context for the user device 102 is reduced as well. For example, the user device 102 is connected to the ECS 214*a* before a handover is initiated. The EC-AMF 218 receives information about one or more candidate base stations for a handover from the AMF 208, including the neighbor base station 108. Based on the received candidate base station information, the EC-AMF 218 identifies which of the edge compute servers 214 can be used to accept the transfer of applications and associated data and context for the user device 102 after the handover. The EC-AMF 218 transfers copies of the application to each of the candidate edge compute servers 214. The EC-AMF 218 receives an indication from the AMF 208 that the user device 102 is being handed over to the neighbor base station 108 and the EC-AMF 218 transfers the context and data for the application to the ECS 214*b*.

In another aspect, the EC-AMF 218 sends information about the status of the transfer to the user device 102 in an Application State Message. The application State Message may include an indication that the transfer is in progress, completed, delayed, failed, and so forth. For example, when the time required for transfer of the application and the associated data and context is longer than the time required to complete a handover, the EC-AMF 218 sends a first Application State Message to the user device 102 indicating that the transfer is in progress. When the transfer is complete the EC-AMF 218 sends a second Application State Message to the user device 102 indicating that the transfer is complete.

Example Methods

Example methods 400 and 500 are described with reference to FIGS. 4 and 5 in accordance with one or more aspects of fifth generation new radio edge computing mobility management. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
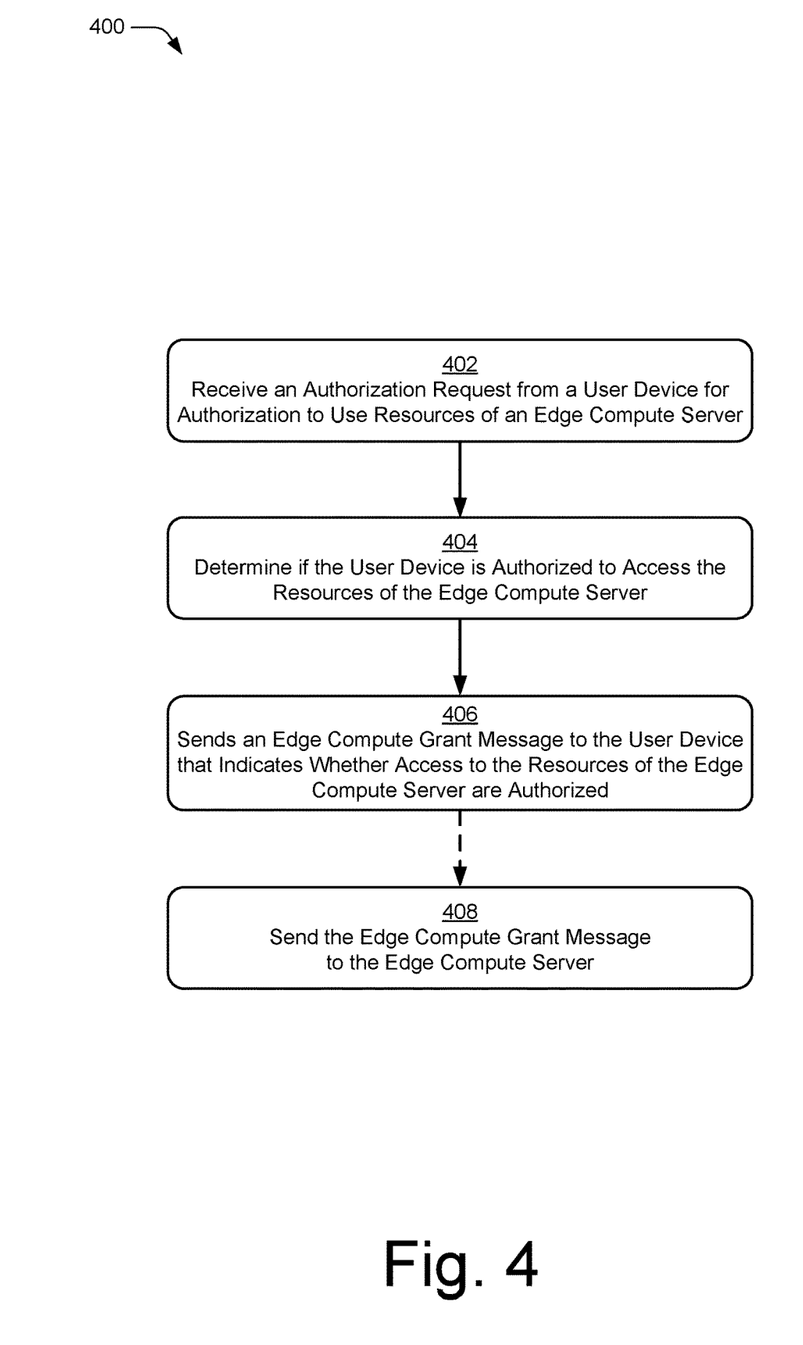
FIG. 4 illustrates an example method of fifth generation new radio edge computing mobility management as generally related to authorizing edge computing resources for a user device in accordance with aspects of the techniques described herein.

FIG. 4 illustrates example method(s) 400 of fifth generation new radio edge computing mobility management as generally related to authorizing edge computing resources for the user device 102. The order in which the method blocks are described are not intended to be construed as a limitation, and any number of the described method blocks can be combined in any order to implement a method or an alternate method.

At block 402, an edge compute management server receives an authorization request from a user device for authorization to use resources of an edge compute server. For example, an edge compute management server included in the EC-AMF 218 receives an edge compute authorization message from the user device 102 that request authorization to use resources of the ECS 214.

At block 404, the edge compute management server determines if the user device is authorized to access the resources of the edge compute server. For example, the edge compute management server included in the EC-AMF 218 determines if the user equipment 102 is authorized to use the resources of the ECS 214.

At block 406, the edge compute management server sends an edge compute grant message to the user device that indicates whether access to the resources of the edge compute server are authorized or denied. For example, the edge compute management server included in the EC-AMF 218 sends an edge compute grant message to the user device 102 indicating that access to the resources of the ECS 214 are authorized or denied.

Optionally at block 408, if the user device is authorized to access the resources of the edge compute server, the edge compute management server sends the edge compute grant message to the edge compute server. For example, the edge compute management server included in the EC-AMF 218 sends the edge compute grant message to the ECS 214 indicating that the user device 102 has been granted access to the ECS 214.

Figure 5:
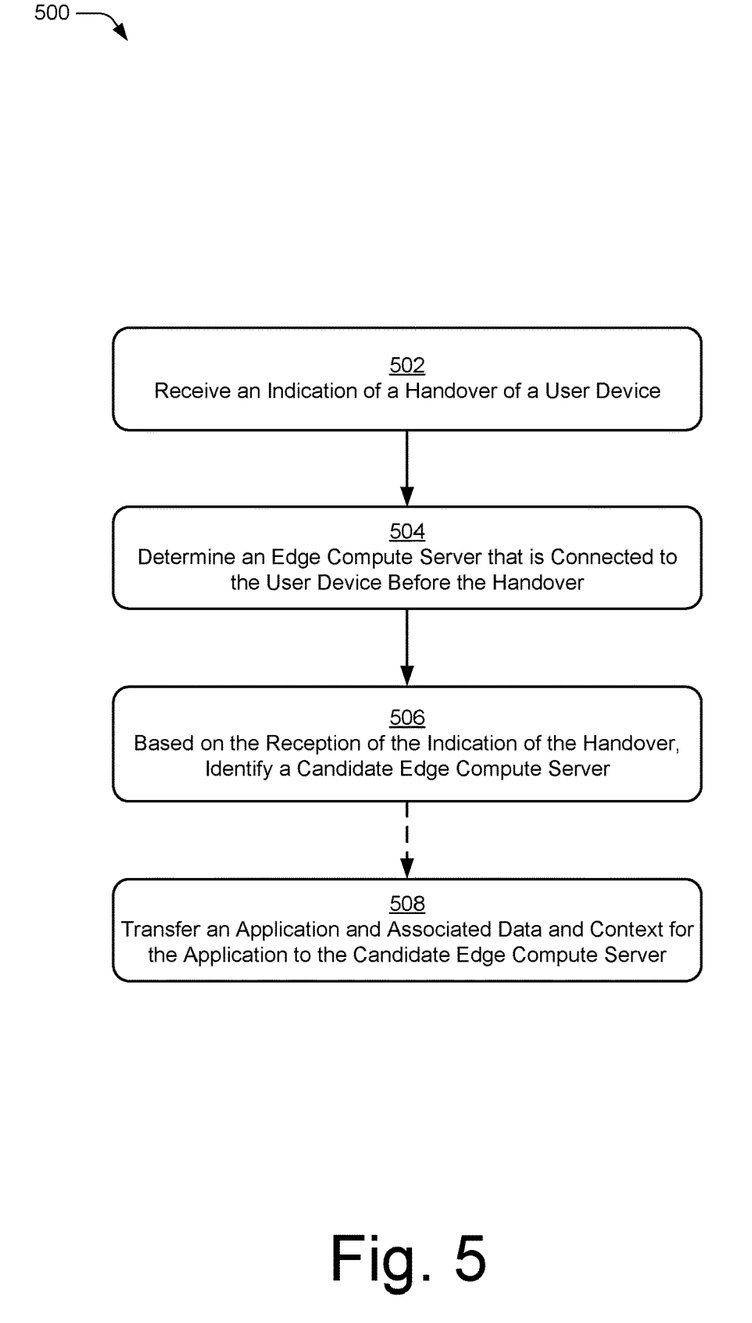
FIG. 5 illustrates an example method of fifth generation new radio edge computing mobility management as generally related to mobility management of edge computing resources for a user device in accordance with aspects of the techniques described herein.

FIG. 5 illustrates example method(s) 500 of fifth generation new radio edge computing mobility management as generally related to mobility management of edge computing resources for the user device 102 by the EC-AMF 218. The order in which the method blocks are described are not intended to be construed as a limitation, and any number of the described method blocks can be combined in any order to implement a method, or an alternate method.

At block 502, an EC-AMF server receives an indication of a handover of a user device. For example, the EC-AMF 218 receives an indication of a handover of the user device 102 between base stations 104 in the wireless communication network from the AMF 208. The received indication may include an identifier of the current base station 104 that provides the serving cell for the user device 102, and another identifier that identifies the neighbor base station 108 that is a candidate to receive the user device 102 during the handover.

At block 504, the EC-AMF server determines an edge compute server that is connected to the user device before the handover. For example, using the identifier of the current base station 104, the EC-AMF 218 determines that the ECS 214a is connected to the user device 102 via the base station 104.

At block 506, based on the reception of the indication of the handover, the EC-AMF server identifies a candidate edge compute server. For example, using the other identifier of the neighbor base station 108, the EC-AMF 218 identifies that ECS 214b is connected to the neighbor base station 108.

At block 508, the EC-AMF server transfers an application and associated data and context for the application to the candidate edge compute server. For example, the EC-AMF 218 transfers the application and associated data and context from the ECS 214a to the ECS 214b.

Although aspects of fifth generation new radio edge computing mobility management have been described in language specific to features and/or methods, the subject of the appended claims is not necessarily limited to the specific features or methods described. Rather, the specific features and methods are disclosed as example implementations of fifth generation new radio edge computing mobility management, and other equivalent features and methods are intended to be within the scope of the appended claims. Further, various different aspects are described, and it is to be appreciated that each described aspect can be implemented independently or in connection with one or more other described aspects.

What is claimed is:

1. A method of managing edge computing resources in a wireless communication network by an Edge Computing Access and Mobility Function (EC-AMF) server, the method comprising:
   receiving, by the EC-AMF server, an indication of a determination to perform a handover of a user device;
   before the receiving the indication of the determination, determining an edge compute server that is connected to the user device, the edge compute server being connected to the user device via a base station;
   based on receiving the indication of the determination, identifying multiple candidate edge compute servers, each of the multiple candidate edge compute servers being connected to a respective one of multiple candidate base stations that can accept the user device during the handover;
   transferring an application to the multiple candidate edge compute servers before the handover is initiated;
   receiving an indication of a selection of one of the multiple candidate base stations as a target base station for the handover; and
   based on receiving the indication of the selection of the target base station for the handover, transferring data and context associated with the application to the one of the candidate edge compute servers associated with the target base station before the handover is completed, wherein the transferring the application, and the transferring the data and context associated with the application enables the user device to connect to the one of the candidate edge compute servers and continue using the application.

2. The method of claim 1, wherein the indication of the determination to perform the handover of the user device includes an indication of the multiple candidate base stations to accept the user device during the handover.

3. The method of claim 1, comprising:
   sending an application state message to the user device, the application state message including a status of the transferring of the application and the data and context associated with the application to the one of the candidate edge compute servers.

4. The method of claim 3, wherein the status of the transfer of the application and the associated data and context includes a status indicating: the transfer is in progress, the transfer is complete, the transfer is delayed, or the transfer failed.

5. The method of claim 1, the method comprising:
   receiving another indication related to the handover, the other indication indicating that the handover is in progress or complete, and indicating an identity of the target base station to accept the user device during the handover.

6. The method of claim 1, wherein the indication of the determination to perform the handover is received from an Access and Mobility Function server.

7. The method of claim 1, further comprising:
sending an edge compute grant message to the user device that indicates whether access to resources of the one of the candidate edge compute servers is authorized or denied.

8. An edge computing-access and mobility server device comprising:
one or more processors; and
a memory comprising instructions for an Edge Computing-Access and Mobility Function (EC-AMF) application, the instructions executable by the one or more processors to configure the one or more processors to:
receive an indication of a determination to perform a handover of a user device;
before receiving the indication of the determination, determine an edge compute server that is connected to the user device, the edge compute server being connected to the user device via a base station;
based on the received indication of the determination, identify multiple candidate edge compute servers, each of the multiple candidate edge compute servers being connected to a respective one of multiple candidate base stations that can accept the user device during the handover;
transfer an application to the multiple candidate edge compute servers before the handover is initiated;
receive an indication of a selection of one of the multiple candidate base stations as a target base station for the handover; and
based on the indication of the selection of the target base station for the handover, transfer data and context associated with the application to the one of the candidate edge compute servers associated with the target base station before the handover is completed, wherein the transfer of the application and the transfer of the data and context is effective to enable the user device to connect to the one of the candidate edge compute servers and continue using the application.

9. The edge computing-access and mobility server device of claim 8, wherein the indication of the determination to perform the handover of the user device includes an indication of the multiple candidate base stations to accept the user device during the handover.

10. The edge computing-access and mobility server device of claim 8, the instructions executable by the one or more processors to configure the one or more processors to:
send an application state message to the user device, the application state message including a status of the transfer of the application and the data and context associated with the application to the one of the candidate edge compute servers.

11. The edge computing-access and mobility server device of claim 10, wherein the status of the transfer of the application and the associated data and context includes a status indicating: the transfer is in progress, the transfer is complete, the transfer is delayed, or the transfer failed.

12. The edge computing-access and mobility server device of claim 8, the instructions executable by the one or more processors to configure the one or more processors to:
receive another indication related to the handover, the other indication indicating that the handover is in progress or complete, and indicating an identity of the target base station to accept the user device during the handover.

13. The edge computing-access and mobility server device of claim 8, wherein the indication of the determination to perform the handover is received from an Access and Mobility Function server.

14. The edge computing-access and mobility server device of claim 8, the instructions executable by the one or more processors to configure the one or more processors to:
send an edge compute grant message to the user device that indicates whether access to resources of the one of the candidate edge compute servers is authorized or denied.

15. A system comprising:
multiple edge compute servers, each edge compute server being connected to a respective base station in a wireless communication network comprising multiple base stations;
an access and mobility server; and
an Edge Computing-Access and Mobility (EC-AMF) server configured to:
receive, from the access and mobility server, an indication of a determination to perform a handover of a user device from a first base station to one of the multiple base stations including a second base station in the wireless communication network;
before receiving the indication of the determination, determine a first edge compute server that is connected to the user device, the first edge compute server being connected to the user device via the first base station;
based on the received indication of the determination, identify multiple candidate edge compute servers including a second edge compute server that is connected to the second base station;
transfer an application to the multiple candidate edge compute servers before the handover is initiated;
receive an indication of a selection of one of the second base station as a target base station for the handover; and
based on receiving the indication of the selection of the second base station as the target base station for the handover, transfer data and context associated with the application to the second edge compute server associated with the second base station before the handover is completed, wherein the transfer of the application and the transferring of the data and context associated with the application from the first edge compute server to the second edge compute server enables the user device to connect to the second edge compute server and continue using the application.

16. The system of claim 15, wherein each edge compute server is connected to the respective base station by an Xe interface.

17. The system of claim 16, wherein the first base station and the second base station are connected via an Xn interface and wherein the application and the associated data and context is transferred from the first edge compute server via the Xe interface to the first base station, wherein the first base station forwards the application and the associated data and context to the second base station via the Xn interface, and wherein the second base station forwards the application and the associated data and context to the second edge compute server via the Xe interface.

18. The system of claim 15, the Edge Computing-Access and Mobility (EC-AMF) server further configured to:
send an application state message to the user device, the application state message including a status of the transfer of the application and the associated data and context for the application to the second edge compute server.

19. The system of claim 18, wherein the status of the transfer of the application and the associated data and context includes a status indicating: the transfer is in progress, the transfer is complete, the transfer is delayed, or the transfer failed.

20. The system of claim 15, the Edge Computing-Access and Mobility (EC-AMF) server further configured to:
   send an edge compute grant message to the user device that indicates whether access to resources of the second edge compute server is authorized or denied.

* * * * *